United States Patent
Fu et al.

(10) Patent No.: US 11,494,938 B2
(45) Date of Patent: Nov. 8, 2022

(54) MULTI-PERSON POSE ESTIMATION USING SKELETON PREDICTION

(71) Applicant: Northeastern University, Boston, MA (US)

(72) Inventors: Yun Fu, Wellesley, MA (US); Yue Wu, Somerville, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 17/046,398

(22) PCT Filed: May 15, 2019

(86) PCT No.: PCT/US2019/032465
§ 371 (c)(1),
(2) Date: Oct. 9, 2020

(87) PCT Pub. No.: WO2019/222383
PCT Pub. Date: Nov. 21, 2019

(65) Prior Publication Data
US 2021/0104067 A1    Apr. 8, 2021

Related U.S. Application Data

(60) Provisional application No. 62/672,025, filed on May 15, 2018.

(51) Int. Cl.
*G06T 7/73* (2017.01)
*G06K 9/62* (2022.01)

(52) U.S. Cl.
CPC ............... *G06T 7/75* (2017.01); *G06K 9/627* (2013.01); *G06T 2207/20081* (2013.01); *G06T 2207/20084* (2013.01); *G06T 2207/30196* (2013.01)

(58) Field of Classification Search
CPC ............. G06T 7/75; G06T 2207/20081; G06T 2207/20084; G06K 9/627
See application file for complete search history.

(56) References Cited

U.S. PATENT DOCUMENTS

| 6,985,620 B2 | 1/2006 | Sawhney et al. |
| 8,351,646 B2 | 1/2013 | Fujimura et al. |

(Continued)

FOREIGN PATENT DOCUMENTS

| WO | 2006099597 A2 | 9/2006 |
| WO | WO 2019/222383 A1 | 11/2019 |
| WO | 2020232069 A1 | 11/2020 |

OTHER PUBLICATIONS

International Search Report and Written Opinion for Int'l Application No. PCT/US2019/032465, titled: Multi-Person Pose Estimation Using Skeleton Prediction, dated Aug. 16, 2019.

(Continued)

*Primary Examiner* — Md K Talukder
(74) *Attorney, Agent, or Firm* — Hamilton, Brook, Smith & Reynolds, P.C.

(57) ABSTRACT

Embodiments provide functionality for identifying joints and limbs in images. An embodiment extracts features from an image to generate feature maps and, in turn, processes the feature maps using a single convolutional neural network trained based on a target model that includes joints and limbs. The processing generates both a directionless joint confidence map indicating confidence with which pixels in the image depict one or more joints and a directionless limb confidence map indicating confidence with which the pixels in the image depict one or more limbs between adjacent joints of the one or more joints, wherein adjacency of joints is provided by the target model. To continue, indications of the one or more joints and the one or more limbs in the image are generated using the directionless joint confidence (Continued)

map, the directionless limb confidence map, and the target model. Embodiments can be deployed on mobile and embedded systems.

18 Claims, 12 Drawing Sheets

(56) References Cited

U.S. PATENT DOCUMENTS

| | | | | |
|---|---|---|---|---|
| 2009/0252423 | A1* | 10/2009 | Zhu | G06V 40/103 382/209 |
| 2019/0188533 | A1* | 6/2019 | Katabi | G06V 10/34 |
| 2020/0074678 | A1* | 3/2020 | Ning | G06T 7/75 |
| 2020/0294266 | A1* | 9/2020 | Botonjic | G06K 9/627 |
| 2021/0104067 | A1* | 4/2021 | Fu | G06V 10/764 |
| 2021/0192783 | A1* | 6/2021 | Huelsdunk | G06T 7/75 |
| 2021/0248772 | A1* | 8/2021 | Iqbal | G06N 3/0454 |

OTHER PUBLICATIONS

International Search Report and Written Opinion for Int'l Application No. PCT/US2020/032595, titled: Video 2D Multi-Person Pose Estimation Using Multi-Frame Refinement and Optimization, dated Jul. 7, 2020.
Andriluka, M. et al., "Pictorial Structures Revisited: People Detection and Articulated Pose Estimation," *Computer Vision and Pattern Recognition, CVPR 2009 IEEE Conference on*, pp. 1014-1021, IEEE (2009).
Cao, Z. et al., "Realtime Multi-Person 2D Pose Estimation using Part Affinity Fields," *Proceedings of the IEEE Conference on Computer Vision and Pattern Recognition*, pp. 7291-7299 (2017).
Charles, J., et al.: "Personalizing Human Video Pose Estimation," 2016 IEEE Conference on Computer Vision 15 and Pattern Recognition (CVPR), IEEE (2016).
Chen, X. et al., "Articulated Pose Estimation by a Graphical Model with Image Dependent Pairwise Relations," *Advances in neural information processing systems*, pp. 1736-1744 (2014).
Deng, J., et al., "ImageNet: A Large-Scale Hierarchical Image Database," In CVPR09, (2009).
Fang, H.-S. et al., "RMPE: Regional Multi-Person Pose Estimation," *The IEEE International Conference on Computer Vision (ICCV)*, vol. 2 (2017).
Gkioxari, G. et al., "Articulated Pose Estimation using Discriminative Armlet Classifiers," *2013 IEEE Conference on Computer Vision and Pattern Recognition (CVPR)*, pp. 3342-3349, IEEE (2013).
He, K. et al., "Mask R-CNN," *Computer Vision (ICCV), IEEE International Conference on*, pp. 2980-2988, IEEE (2017).
Hossain, M., et al., "Exploiting temporal information for 3D pose estimation," *Arxiv.Org, Cornell University Library* (2017).
Howard, A.G. et al., "MobileNets: Efficient Convolutional Neural Networks for Mobile Vision Applications," *arXiv preprint arXiv:1704.04861* (2017).
Insafutdinov, E., et al.: "Articulated Multi-person Tracking in the Wild," *Arxiv.Org, Cornell University Library*, 14853 (2016).
Insafutdinov, E. et al., "DeeperCut: A Deeper, Stronger, and Faster Multi-person Pose Estimation Model," European Conference on Computer Vision 2016, pp. 34-50 (2016).
Johnson, S. et al., "Learning Effective Human Pose Estimation from Inaccurate Annotation," *2011 IEEE conference on Computer Vision and Pattern Recognition (CVPR)*, pp. 1465-1472, IEEE (2011).
Newell, A. et al., "Associative Embedding: End-to-End Learning for Joint Detection and Grouping," *Advances in Neural Information Processing Systems*, pp. 2274-2284 (2017).
Newell, A. et al., "Stacked Hourglass Networks for Human Pose Estimation," *European Conference on Computer Vision*, pp. 483-499, Springer, 2016.
Papandreou, G. et al., "PersonLab: Person Pose Estimation and Instance Segmentation with a Bottom-Up, Part-Based, Geometric Embedding Model," Proceedings of the European Conference on Computer Vision (ECCV) 21 pages (2018).
Papandreou, G. et al., "Towards Accurate Multi-person Pose Estimation in the Wild," *Proceedings of the IEEE Conference on Computer Vision and Pattern Recognition*, pp. 4903-4911 (2017).
Payer, C., et al., "Simultaneous Multi-Person Detection and Single-Person Pose Estimation With a Single Heatmap Regression Network" Retrieved from the Internet: URL: https://pdfs.semanticscholar.org/aa65/ 78f40975ecdc0d80af6941bd22403f06abff.pdf [retrieved on Nov. 14, 2019] (2017).
Pishchulin, L. et al., "DeepCut: Joint Subset Partition and Labeling for Multi Person Pose Estimation," *Proceedings of the IEEE Conference on Computer Vision and Pattern Recognition*, pp. 4929-4937 (2016).
Simonyan, K., et al., "Very deep convolutional networks for large-scale image recognition," arXiv preprint arXiv: 1409.1556 (2015).
Song, J., et al., "Thin-Slicing Network: A Deep Structured Model for Pose Estimation in Videos," Arxiv.Org, Cornell University Library, 14853 (2017).
Sun, K. et al., "Human Pose Estimation using Global and Local Normalization," *Proceedings of the IEEE Conference on Computer Vision and Pattern Recognition*, pp. 5599-5607 (2017).
Szegedy, C. et al., "Going Deeper with Convolutions," *Proceedings of the IEEE Conference on Computer Vision and Pattern Recognition* 9 pages (2015).
Toshev et al., "DeepPose: Human Pose Estimation via Deep Neural Networks," *Proceedings of the IEEE conference on computer vision and pattern recognition*, pp. 1653-1660 (2014).
Wei, S.-E et al., "Convolutional Pose Machines," *Proceedings of the IEEE Conference on Computer Vision and Pattern Recognition*, pp. 4724-4732 (2016).
Yang et al., "Articulated pose estimation with flexible mixtures-of-parts," *Computer Vision and Pattern Recognition (CVPR), 2011 IEEE Conference on*, pp. 1385-1392, IEEE (2011).
Yi, Y., et al.: "Single online visual object tracking with enhanced tracking and detection learning," *Multimedia Tools and Applications*, vol 78, No. 9 (2018).
International Preliminary Report on Patentability for Int'l Application No. PCT/US2019/032465, titled: Multi-Person Pose Estimation Using Skeleton Prediction, dated Nov. 17, 2020.
International Preliminary Report on Patentability for PCT/US2020/032595 titled "Video 2D Multi-Person Pose Estimation Using Multi-Frame Refinement and Optimization," dated Nov. 25, 2021.

* cited by examiner

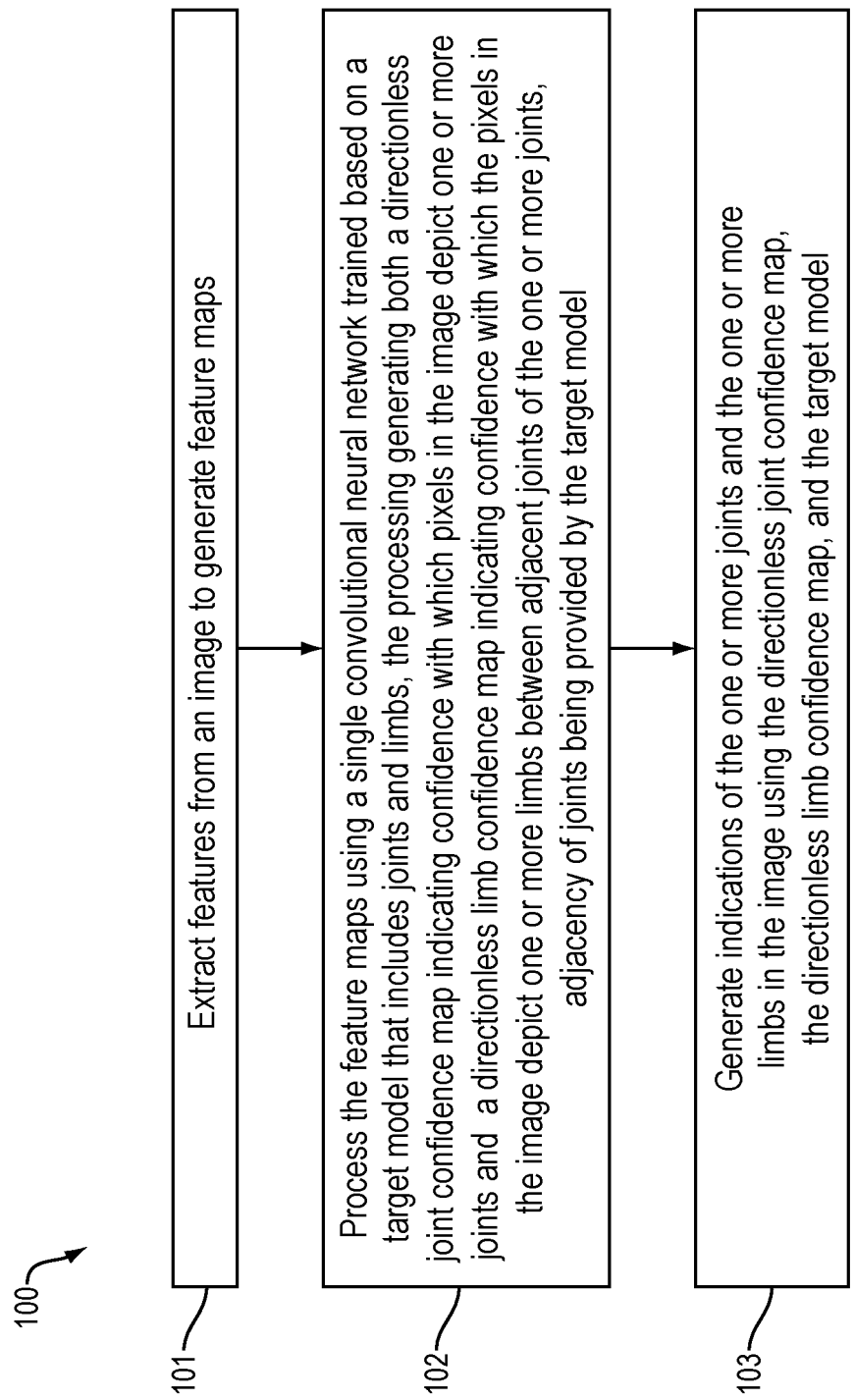

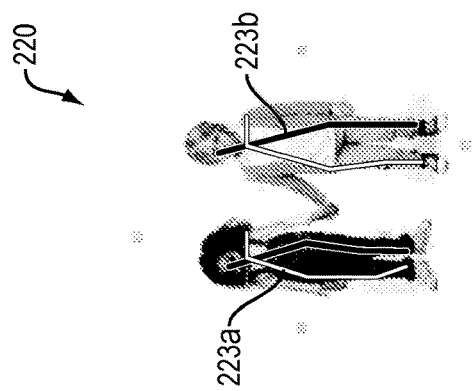
FIG. 2D
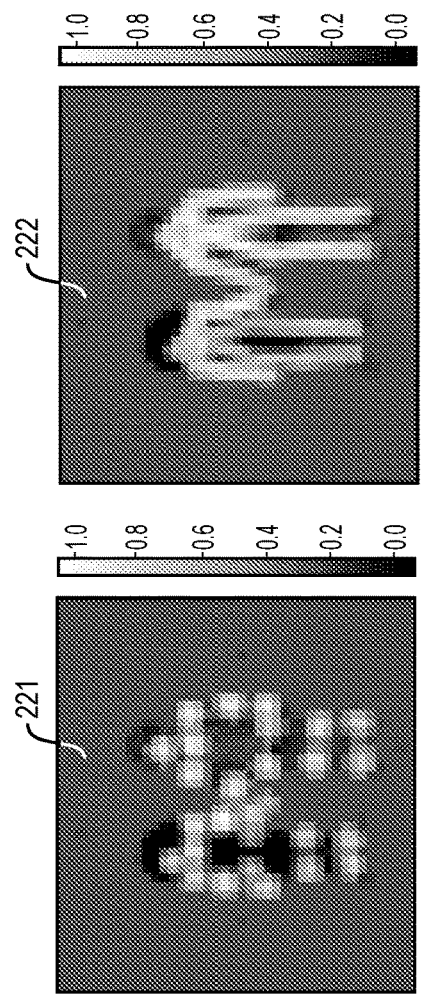
FIG. 2C
FIG. 2B
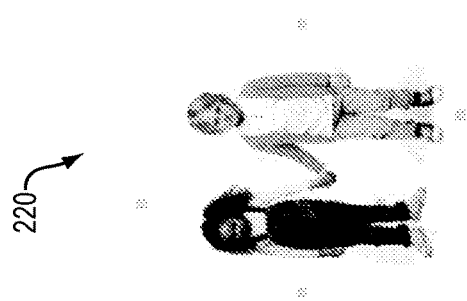
FIG. 2A

MULTI-PERSON POSE ESTIMATION USING SKELETON PREDICTION

RELATED APPLICATIONS

This application is the U.S. National Stage of International Application No. PCT/US2019/032465, filed on May 15, 2019, which designates the U.S., published in English, which claims the benefit of U.S. Provisional Application No. 62/672,025, filed on May 15, 2018. The entire teachings of the above applications are incorporated herein by reference.

BACKGROUND

Pose estimation, i.e., locating body parts in images, has been a computer vision task of increasing importance. Likewise, multi-person pose estimation has become increasingly desired.

SUMMARY

While techniques exist for pose estimation and multi-person pose estimation, existing methods cannot be implemented on mobile and embedded systems. Embodiments of the present invention solve these problems and provide improved methods for pose estimation, i.e., identifying joints and limbs in images.

An example embodiment is directed to a method of identifying joints and limbs in an image. Such an example embodiment, first, extracts features from an image to generate feature maps and, second, processes the feature maps using a single convolutional neural network trained based on a target model that includes joints and limbs. The processing generates both a directionless joint confidence map indicating confidence with which pixels in the image depict one or more joints and a directionless limb confidence map indicating confidence with which the pixels in the image depict one or more limbs between adjacent joints of the one or more joints. In an embodiment, adjacency of joints is provided by the target model. The method continues by generating indications of the one or more joints and the one or more limbs in the image using the directionless joint confidence map, the directionless limb confidence map, and the target model.

In another embodiment, the convolutional neural network is a first convolutional neural network, and the method further refines the limb and joint identifications. Such an embodiment concatenates the feature maps, the directionless joint confidence map, and the directionless limb confidence map and, in turn, processes the concatenated feature maps, directionless joint confidence map, and directionless limb confidence map using a second convolutional neural network trained based on the target model. In an example embodiment, the processing using the second convolutional neural network generates both a refined directionless joint confidence map indicating confidence with which the pixels in the image depict the one or more joints and a refined directionless limb confidence map indicating confidence with which the pixels in the image depict the one or more limbs. In such an embodiment, the indications of the one or more joints and the one or more limbs in the image are generated using the refined directionless joint confidence map, the refined directionless limb confidence map, and the target model.

According to an embodiment, the single convolutional neural network is formed of separable convolutional network elements. In yet another embodiment, the convolutional neural network has a single set of weights, and the method further includes training the convolutional neural network, based on the target model, by adjusting the single set of weights.

According to an embodiment, the target model indicates joints and limbs of a target object. In this way, the target model identifies joints and limbs that are trying to be identified in an image. In embodiments, neural networks are trained using the target model and/or data based on the target model. In this way, embodiments leverage neural networks that are trained to identify particular joints and limbs. For example, in an embodiment, a neural network is trained using feature map data that is based upon identifying joints and limbs of a desired target. In an embodiment, the target model has annotations of joints and limbs and feature maps are generated upon these annotations and the feature maps are used for training the neural network. Embodiments may be used to identify limbs and joints of any type of object. For example, in an embodiment, the target model represents at least one of: a human, animal, machine, and robot, amongst other examples. As such, an embodiment identifies joints and limbs of at least one of a human, animal, machine, and robot. In order to identify joints and limbs of these various target objects, an embodiment is trained using a target model and/or data that is based upon the target object being a human, animal, machine, or robot, amongst other examples, such as insects.

Yet another embodiment is directed to multi-target pose estimation, i.e., identifying the joints and limbs of multiple targets, e.g., people, in an image. In such an embodiment, the image contains multiple target objects, and indications of limbs and joints in the image for each of the multiple target objects are generated. Such an embodiment may further include generating respective indications of a pose of each of the multiple target objects.

According to an embodiment, processing the feature maps using a single convolutional neural network further comprises generating a respective joint confidence map for each joint type in the image. In such an embodiment, each respective joint confidence map indicates confidence with which pixels in the image depict a respective joint type.

Another embodiment is directed to a computer system for identifying joints and limbs in an image. The system includes a processor and a memory with computer code instructions stored thereon that cause the system identify joints and limbs as described herein. In an example embodiment, the system is configured to (1) extract features from an image to generate feature maps and (2) process the feature maps using a single convolutional neural network trained based on a target model that includes joints and limbs. In such a system embodiment, the processing generates both a directionless joint confidence map that indicates confidence with which pixels in the image depict one or more joints and a directionless limb confidence map that indicates confidence with which the pixels in the image depict one or more limbs between adjacent joints of the one or more joints, wherein adjacency of joints is provided by the target model. According to an embodiment, the target model indicates which joints are adjacent, e.g., right shoulder and right elbow. Embodiments may utilize a convolutional network trained based upon the target model. This training may include training the network using data that directly or indirectly indicates which joints and limbs are to be identified and which joints are adjacent. In this way, such an embodiment is trained based upon a target model to identify target joints and limbs. The system is further configured to generate indications of the one or more joints and the one or more limbs in the image using the directionless joint confidence map, the directionless limb confidence map, and the target model.

Another embodiment is directed to a computer program product for identifying joints and limbs in an image. The computer program product comprises one or more non-transitory computer-readable storage devices and program instructions stored on at least one of the one or more storage devices. The program instructions, when loaded and executed by a processor, cause an apparatus associated with the processor to identify the joints and limbs in an image as described herein. In an example embodiment, the program instructions cause an apparatus to extract features from an image to generate feature maps and process the feature maps using a single convolutional neural network trained based on a target model that includes joints and limbs. In such an embodiment of the computer program product, the processing generates both a directionless joint confidence map indicating confidence with which pixels in the image depict one or more joints and a directionless limb confidence map indicating confidence with which the pixels in the image depict one or more limbs between adjacent joints of the one or more joints, wherein adjacency of the joints is provided by the target model. Further, the program instructions cause the apparatus to generate indications of the one or more joints and the one or more limbs in the image by using the directionless joint confidence map, the directionless limb confidence map, and the target model.

It is noted that embodiments of the method, system, and computer program product may be configured to implement any embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1 is a flow diagram of a method for identifying joints and limbs in an image according to an embodiment.

FIG. 2A is an input image that may be processed using embodiments to identify joints and limbs in the image.

FIG. 2B is an example output of a convolutional network implementing embodiments.

FIG. 2C is an example output of a convolutional network implementing embodiments.

FIG. 2D depicts indications of limbs and joints in the input image of FIG. 2A that may result from an embodiment.

DETAILED DESCRIPTION

Figure 3:
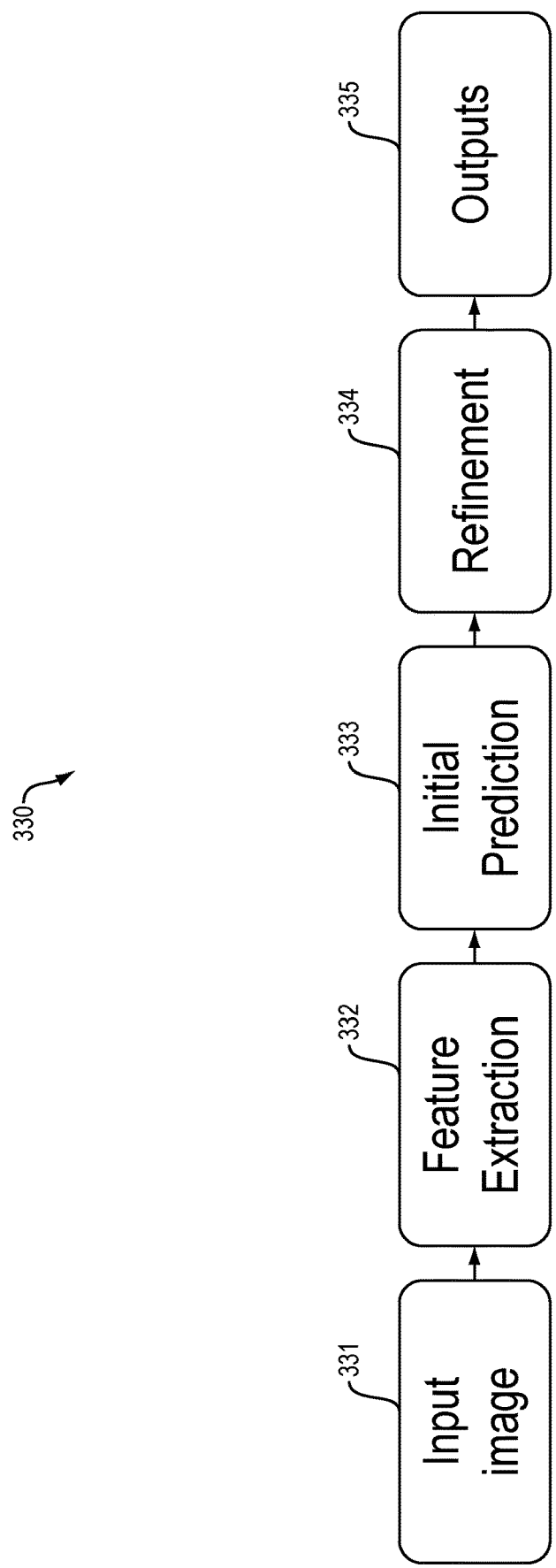
FIG. 3 is a simplified block diagram of a framework of an embodiment for detecting limbs and joints in images.

A description of example embodiments follows.

Multi-person pose estimation, which includes identifying joints and limbs in images, is a challenging problem in computer vision. Many deep learning approaches have been proposed for this problem; however, these existing deep learning methods utilize models that are too heavy, e.g., computationally expensive, to be run in mobile or embedded systems. Embodiments of the present invention solve this problem and provide a lightweight framework that directly predicts body parts, i.e., joints, as well as skeletons, i.e., limbs. Embodiments provide limb and joint predictions that show a probability of the joints and limbs occurring at each location, e.g., pixel, in an image. In embodiments, the limb prediction only costs one additional confidence map in addition to the confidence maps for joints. Further, the additional limb prediction confidence map is used in embodiments to associate the detected joints. Embodiments provide this functionality through use of a lightweight neural network structure that uses separable convolution modules. Embodiments can reach 100 frames per second (fps) on a workstation using graphics processing units (GPUs) and can be deployed on mobile and embedded systems.

The goal of pose estimation and, specifically, multi-target pose estimation, is locating joints, e.g., body parts, for all targets, e.g., people, in one image. Multi-target pose estimation is a challenging problem in computer vision and has multiple applications, including: action recognition, computer interaction, and virtual reality, amongst other examples. Recently, with the development of deep learning, solutions to the problem of multi-target pose estimation have improved [Cao et al., Realtime multi-person 2d pose estimation using part affinity fields, *Proceedings of the IEEE Conference on Computer Vision and Pattern Recognition*, pages 7291-7299, 2017; Fang et al., Rmpe: Regional multi-person pose estimation, *The IEEE International Conference on Computer Vision (ICCV)*, volume 2, 2017; Newell et al., Stacked hourglass networks for human pose estimation, *European Conference on Computer Vision*, pages 483-499, Springer, 2016; Papandreou et al., Towards accurate multi-person pose estimation in the wild, *Proceedings of the IEEE Conference on Computer Vision and Pattern Recognition*, pages 4903-4911, 2017; He et al., *Computer Vision (ICCV), IEEE International Conference on*, pages 2980-2988, IEEE, 2017].

Although great progress has been made, the existing methods cannot be run on mobile and embedded systems. Many systems [Fang et al., Rmpe: Regional multi-person pose estimation, *The IEEE International Conference on Computer Vision (ICCV)*, volume 2, 2017; Papandreou et al., Towards accurate multi-person pose estimation in the wild, *Proceedings of the IEEE Conference on Computer Vision and Pattern Recognition*, pages 4903-4911, 2017] follow a top-down approach that first, detects a target, e.g., person, and second, detects body parts, e.g., joints. Because the two steps in top-down approaches are pipelined, with target detection as the first step, top-down approaches rely heavily on the output of the target detection. Further, existing top-down approaches are also time-consuming because they apply single target pose estimation to every detected target. In light of this, methods have been implemented that employ a bottom-up process that first detects body parts. Cao [Cao et al., Realtime multi-person 2d pose estimation using part affinity fields, *Proceedings of the IEEE Conference on Computer Vision and Pattern Recognition,* pages 7291-7299, 2017] proposed a real-time multi-person 2D pose estimation system on a workstation using very powerful GPUs. Newell [Newell et al., Associative embedding: End-to-end learning for joint detection and grouping, *Advances in Neural Information Processing Systems,* pages 2274-2284, 2017] utilized associative embedding to associate body parts based on the stack hourglass network module. These existing methods, however, are still too heavy to be run in mobile or embedded systems.

To solve these problems, embodiments of the invention disclosed herein provide a lightweight framework that directly predicts joints, i.e., body parts, as well as limbs, i.e., skeletons, using separable convolution modules [Howard et al., Mobilenets: Efficient convolutional neural networks for mobile vision applications, arXiv preprint arXiv:1704.04861, 2017] in a neural network structure. In embodiments, a deep convolutional neural network is used to generate confidence maps for joints directly. The confidence maps show a probability of each body part's occurring at each location in the image. An additional confidence map is also generated at the same time, using the same convolutional neural network, to predict all limbs in the image. The confidence map for the limbs shows the probability of limbs occurring at each location in the image. In an embodiment, a limb is defined as a rectangular area between two associated body parts, i.e., joints. In an ideal case, the limb confidence map has a confidence of 1 on the limb areas of the image and a confidence of 0 in the other areas of the image. The human skeleton includes all limbs in the image of multiple people. In other words, according to an embodiment, one directionless confidence map is used for all limbs (the human skeleton) of all people in the image. As such, even if there are multiple people in an image, only one directionless confidence map is used. In an embodiment, Euclidean loss is applied to regress the confidence map of the limbs. The cost of the additional limb confidence map is small, but the limb confidence map helps to solve the body part, e.g., limb, association problem. For instance, when determining which joints are associated, a limb that passes two identified joints should have a high response, i.e., an indication of high confidence, in the limb confidence map. If there is not a high limb confidence between two joints, the two joints will not be associated together. As such, embodiments leverage the limb confidence map when determining which joints are associated.

Embodiments provide multiple improvements over existing methods. For instance, embodiments provide a method of limb prediction that only costs one more confidence map in the convolutional neural network, but helps solve the body part association problem. Further, embodiments provide the joint and limb location functionality using a lightweight neural network structure that uses separable convolutional modules and embodiments can reach 100 fps on a workstation using GPUs and can be deployed on mobile and embedded systems.

Two-dimensional human pose estimation has been a long standing problem in computer vision [Andriluka et al., Pictorial structures revisited: People detection and articulated pose estimation, *Computer Vision and Pattern Recognition, CVPR* 2009 *IEEE Conference on,* pages 1014-1021, IEEE, 2009; Gkioxari et al., Articulated pose estimation using discriminative armlet classifiers, *Computer Vision and Pattern Recognition (CVPR),* 2013 *IEEE Conference on,* pages 3342-3349, IEEE, 2013; Yang et al., Articulated pose estimation with flexible mixtures-of-parts, *Computer Vision and Pattern Recognition (CVPR),* 2011 *IEEE Conference on,* pages 1385-1392, IEEE, 2011; Johnson et al., Learning effective human pose estimation from inaccurate annotation, *Computer vision and pattern recognition (CVPR),* 2011 *IEEE conference on,* pages 1465-1472, IEEE, 2011; Chen et al., Articulated pose estimation by a graphical model with image dependent pairwise relations, *Advances in neural information processing systems,* pages 1736-1744, 2014]. Before deep learning was used, methods were developed that implemented human pose estimation utilizing pictorial structures [Andriluka et al., Pictorial structures revisited: People detection and articulated pose estimation, *Computer Vision and Pattern Recognition, CVPR* 2009 *IEEE Conference on,* pages 1014-1021, IEEE, 2009] or graphical models [Chen et al., Articulated pose estimation by a graphical model with image dependent pairwise relations, *Advances in neural information processing systems,* pages 1736-1744, 2014]. Recently, thanks to the development of deep learning, methods for human pose estimation utilizing deep convolutional neural models have increased in popularity. These existing deep learning methods can be roughly divided into two categories, single target, e.g., person, or multi-target estimation.

Single target pose estimation assumes that one target has been located in an image. The goal of pose estimation for a single target is to find all body parts, e.g., limbs, for that single person. Toshev et al. [Toshev et al., Deeppose: Human pose estimation via deep neural networks, *Proceedings of the IEEE conference on computer vision and pattern recognition,* pages 1653-1660, 2014] proposed DeepPose which used a cascade of convolutional neural networks to regress body joints. Newell et al., [Newell et al., Stacked hourglass networks for human pose estimation, *European Conference on Computer Vision,* pages 483-499, Springer, 2016] introduced a carefully designed hourglass module and stacked these modules to boost performance. Wei et al. [Wei et al., Convolutional pose machines, *Proceedings of the IEEE Conference on Computer Vision and Pattern Recognition,* pages 4724-4732, 2016] employed a multi-stage architecture to predict the body parts from coarse to fine. Sun et al. [Sun et al., Human pose estimation using global and local normalization, *Proceedings of the IEEE Conference on Computer Vision and Pattern Recognition,* pages 5599-5607, 2017] normalized target body and limbs to reduce the variations of body parts. These existing methods rely on the assumption that a target is "well located." "Well located" describes the person detection in the existing single person pose estimation methods. Single person pose estimation includes two stages: (1) person detection that locates each person, resulting in one rectangle bounding box for each person, and (2) pose estimation of each person. If a person or target is well located, it means that the detected rectangle bounding box contains the person. If a person or target is not well located, it means the bounding box might be wrong so that the rectangle bounding box only contains part of the person. When the bounding box is wrong, the second stage (pose estimation) is wrong. Oftentimes, with these existing methods, the assumption that a target is "well located" from an image does not hold and wrong detection of targets leads to poor performance.

Multi-target pose estimation aims to estimate poses, e.g., the joints and limbs, of multiple targets in an image. The existing approaches for multi-target pose estimation can be divided into two categories: top-down approaches and bottom-up approaches. Top-down approaches detect targets first using a target detector and then using a single target pose estimator determine poses for the detected targets in the image. He et al. [He et al., Mask r-cnn, *Computer Vision (ICCV)*, 2017 *IEEE International Conference on*, pages 2980-2988, IEEE, 2017] extended the Mask-RCNN framework to human pose estimation by predicting a one-hot mask for each body part. Papandreou et al. [Papandreou et al., Towards accurate multi-person pose estimation in the wild, *Proceedings of the IEEE Conference on Computer Vision and Pattern Recognition*, pages 4903-4911, 201] utilized a Faster RCNN detector to predict person boxes and applied ResNet in a fully convolutional fashion to predict heatmaps for each body part. Fang et al. [Fang et al., Rmpe: Regional multi-person pose estimation, *The IEEE International Conference on Computer Vision (ICCV)*, vol. 2, 2017] designed a symmetric spatial transformer network to alleviate the inaccurate bounding box problem. In contrast, bottom-up approaches detect body parts, e.g., limbs, first and then, second associate body parts into targets, e.g., persons. Pishchulin et al. [Pishchulin et al., Deepcut: Joint subset partition and labeling for multi person pose estimation, *Proceedings of the IEEE Conference on Computer Vision and Pattern Recognition*, pages 4929-4937, 2016] proposed using an Inter Linear Program method to solve the body part association problem. Cao et al. [Cao et al., Realtime multi-person 2d pose estimation using part affinity fields, *Proceedings of the IEEE Conference on Computer Vision and Pattern Recognition*, pages 7291-7299, 2017] introduced a Part Affinity Field to predict the direction and activations for each limb to help associate body parts. Newell et al. [Newell et al., Associative embedding: End-to-end learning for joint detection and grouping, In Advances in Neural Information Processing Systems, pages 2274-2284, 2017] utilized predicted pixel-wise embeddings to assign detected body parts into different groups.

Embodiments implement an improved bottom-up approach for multi-target pose estimation. Unlike existing methods, embodiments directly predict a confidence map for the limbs which is used to associate the detected joints. FIG. 1 depicts one such example embodiment 100 for identifying joints and limbs in an image. The method 100, extracts 101 features from an image to generate feature maps. According to an embodiment, extracting features and generating feature maps includes transform an image to features maps that contain useful information to predict joints and limbs. In an embodiment, extracting features includes convoluting the image with multiple kernels and transforming the image into one or more feature maps that contain useful information to predict joints and limbs. To illustrate, consider an example where a target in an image is represented as pixels in red, green, and blue, and the target contains joints and limbs. In such an example, extracting features and generating feature maps (101) includes transforming the pixels into feature maps, e.g. tensors, that contain information related to joints and limbs. According to an embodiment of the method 100, extracting 101 features is implemented using a computer based extraction module comprising a convolutional neural network, such as the module 440 described hereinbelow in relation to FIG. 4.

Returning to FIG. 1, the method 100 continues and processes 102 the feature maps using a single convolutional neural network trained based on a target model that includes joints and limbs. The processing 102 generates both a directionless joint confidence map indicating confidence, e.g., probability, with which pixels in the image depict one or more joints and a directionless limb confidence map indicating confidence with which the pixels in the image depict one or more limbs between adjacent joints of the one or more joints. In the method 100, adjacency of joints is provided by the target model. According to an embodiment of the method 100, the target model indicates joints and limbs for which detection is desired. Further, the target model indicates adjacency of joints, i.e., which joints are associated and, thus, have a limb between them. To illustrate, in the example of human detection, the target model may indicate that targets, e.g., humans, in the image that are being identified, are composed of joints including: a right shoulder, a right elbow, a right wrist, a left shoulder, a left elbow, a left wrist, a right hip, a right knee, a right ankle, a left hip, a left knee, a left ankle, a neck, and a head. Further the target model indicates which joints have a limb between them, e.g., the head neck limb is between the head and the neck, the neck left shoulder limb is between the neck and the left shoulder, the neck right shoulder limb is between the neck and the right shoulder, the left shoulder elbow limb is between the left shoulder and the left elbow, the left elbow wrist limb is between the left elbow and the left wrist, the right shoulder elbow limb is between the right shoulder and the right elbow, the right elbow wrist limb is between the right elbow and the right wrist, the neck left hip limb is between the neck and the hip shoulder, the neck right hip limb is between the neck and the right hip, the left hip knee limb is between the left hip and the left knee, the left knee ankle limb is between the left knee and the left ankle, the right hip knee limb is between the right hip and the right knee, and the right knee ankle limb is between the right knee and the right ankle.

In an embodiment of the method 100, the convolutional neural network used for the processing 102 is trained based upon the target model. According to an embodiment, this training uses data that indicates, either directly or indirectly, which joints and limbs are to be identified and which joints are adjacent. Such an embodiment thus performs the processing 102 and joint and limb identification based upon a target model. In this way, such an embodiment utilizes a convolutional network that is trained to (i) identify particular target joints, (ii) identify particular target limbs, and (iii) associate joints and limbs which compose target objects in the image. In an embodiment, the target model may be implemented by decomposing the target into joints and limbs that can indicate the target. For example, the human target in the image 220 described hereinbelow, is composed of joints and limbs that indicate the human target.

As described above, the processing 102 generates a directionless limb confidence map and a directionless joint confidence map. The confidence maps are directionless in that there is no indication of direction, e.g., the confidence maps are not comprised of vector values that are directional. The processing 102 uses a single convolutional network. In other words, a single convolutional neural network outputs the one or more limb confidence map and the one or more joint confidence map. According to an embodiment, the processing 102 may be implemented using the module 550 that includes the convolutional neural network implemented with the modules 552a-c, 553, and 554, described hereinbelow in relation to FIG. 5.

The method 100 continues by generating 103 indications of the one or more joints and the one or more limbs in the image using the directionless joint confidence map, the directionless limb confidence map, and the target model. Generating the indications 103 of the joints and limbs may include generating any indicator e.g., visual, audible, etc., of any kind which represents or otherwise provides a perceivable representation of the limbs and joints. For instance, in an embodiment, generating the indications 103 may generate stick figures visually depicting the joints and limbs of the targets in the image, such as the stick figures 223a-b depicted in FIG. 2D. The generating 103 uses the joint confidence map, directionless limb confidence map, and target model to make a final determination of the location of the limbs and joints in the input image. According to an embodiment, the final determination is made using the Body Part/Joint Prediction functionality and Limb/Skeleton Prediction functionality described hereinbelow. In an embodiment, the joint prediction is made using a threshold of confidence that a pixel is identified as a joint if the joint confidence of that pixel is higher than the threshold. Similarly, in an embodiment, the limb prediction is made using the same threshold of confidence that a pixel is identified as a limb if the limb confidence of that pixel is higher than the threshold. Further, according to an embodiment, the target model specifies the joints and limbs to indicate. The generating 103 also associates limbs and joints. In other words, the generating 103 identifies which joints and limbs belong to which targets.

In another embodiment of the method 100, the convolutional neural network employed for the processing 102, is a first convolutional neural network and such an embodiment of the method 100 further refines the limb and joint confidence maps. In such an embodiment, the feature maps, the directionless joint confidence map, and the directionless limb confidence map are concatenated. In turn, the concatenated feature maps, directionless joint confidence map, and directionless limb confidence map are processed using a second convolutional neural network trained based on the target model. The processing with the second convolutional neural network generates both a refined directionless joint confidence map indicating confidence with which pixels in the image depict the one or more joints and a refined directionless limb confidence map indicating confidence with which the pixels in the image depict the one or more limbs. In such an embodiment, the indications of the one or more joints and the one or more limbs in the image are generated 103 using the refined directionless joint confidence map, the refined directionless limb confidence map, and the target model. In an embodiment, the aforementioned refining may be implemented using the module 660 comprising the convolutional neural network implemented using the modules 664a-c, 665, and 666, described hereinbelow in relation to FIG. 6.

According to an embodiment, the single convolutional neural network employed for the processing 102 is formed of separable convolutional network elements, such as the elements 552a-c, 553, and 554, depicted in FIG. 5 and described hereinbelow. According to an embodiment of the method 100, the convolutional neural network employed for the processing 102 has a single set of weights. Such an embodiment may further include training the convolutional neural network, based on the target model, by adjusting the single set of weights. According to an embodiment, the training is conducted using gradient descent optimization to adjust the single set of weights by minimizing the losses of equation (2) and equation (8) described below. In such an embodiment, the training adjusts the single set of weights in the convolutional neural network to generate the desired directionless joint confidence map and the desired directionless limb confidence map. The training aims at optimizing the weights so that the convolutional neural network can generate the desired directionless joint confidence map and the desired directionless limb confidence map.

According to an embodiment, the target model indicates joints and limbs of a target object. In this way, the target model identifies joints and limbs that are trying to be identified in an image. Embodiments of the method 100 may be used to identify limbs and joints of any type of object. For example, in an embodiment, the target model represents at least one of: a human, animal, machine, and robot, amongst other examples. In this way, such an embodiment identifies joints and limbs of at least one of a human, animal, machine, and robot.

Another embodiment of the method 100 is directed to multi-target pose estimation, i.e., identifying the joints and limbs of multiple targets, e.g., people, in an image. In such an embodiment, the image contains multiple target objects, and indications of limbs and joints in the image for each of the multiple target objects are generated 103. Such an embodiment may further include generating respective indications of a pose of each of the multiple target objects. According to an embodiment, an indication of pose is a combination of the identified joints and limbs for a given target and the spatial relationship and connectivity between the identified joints and limbs.

In an embodiment of the method 100, processing 102 the feature maps using the single convolutional neural network comprises generating a respective joint confidence map for each joint type in the image. In such an embodiment, each respective joint confidence map indicates confidence with which pixels in the image depict a respective joint type. To illustrate, consider the example where the target model indicates that target objects contain a left elbow, a right elbow, a left shoulder and a right shoulder. In such an embodiment, four joint confidence maps are generated: (i) a confidence map indicating confidence with which the pixels in the image depict the left elbow, (ii) a confidence map indicating confidence with which the pixels in the image depict the right elbow, (iii) a confidence map indicating confidence with which the pixels in the image depict the left shoulder, and (iv) a confidence map indicating confidence with which the pixels in the image depict the right shoulder.

Hereinbelow, a problem formulation for limb and joint identification is provided and a framework for identifying limbs and joints according to an embodiment is described. Additional components of embodiments including joint prediction, limb prediction, and part association are also further elaborated upon.

Problem Formulation

Let I be an image with the dimension 3×w×h. A set of points $P_j=\{(x_{i,j}, y_{i,j})|1 \leq i \leq K\}$ represents the K body parts of the j-th ($0 \leq j \leq J$) target, e.g., person, in the image. Herein, the term "person," "people," "human," and the like are used, however, it is noted that embodiments are not limited to detecting limbs and joints of humans and may be implemented to detect limbs and joints of any desired object. $J(J \geq 0)$ is the number of people in the image. All people in the image are represented by the set of their corresponding body parts that denote the set $\{P_j|0 \leq j \leq J\}$. A goal of an embodiment is to build a system to find all the people in one image, that is $I \rightarrow \{P_j|0 \leq j \leq J\}$.

FIG. 2A depicts an input image 220 that may be processed by embodiments to detect limbs and joints in the image 220.

FIG. 2B is a visual depiction of a joint confidence map 221 that may be produced by a convolutional network implementing embodiments. Similarly, FIG. 2C is a visual depiction of a limb confidence map 222 that may be produced by a convolutional network implementing embodiments. FIG. 2D illustrates visual indications 223a and 223b of the joints and limbs identified in the image 220.

FIG. 3 is a simplified block diagram of a framework 330 of an embodiment for detecting limbs and joints. The framework 330 utilizes a feature extraction module 332, initial prediction module 333, and refinement module 334. The input 331 of the framework 330 is an image, such as the image 220. In the framework 330, the input image 331 is fed into a feature extraction module 332 to generate feature maps of the input image 331. The initial prediction module 333 is implemented with a convolutional neural network configured to produce, using the feature maps from the feature extraction module 332, joint and limb confidence maps showing the probability with which pixels in the input image 331 depict joints and limbs. The confidence maps from the initial prediction module 333 are further refined using the refinement module 334. The refinement module 334 is configured to generate refined limb and joint confidence maps, such as the maps 221 and 222 of FIGS. 2B and 2C, respectively, which are provided to the output module 335. The output module 335 is configured to generate indications, such as the indications 223a-b, of the limbs and joints in the input image 331. In an embodiment, the output module 335 associates respective joints with the help of the predicted limbs to generate the final results, e.g., the indications 223a-b.

Body Part/Joint Prediction

For one joint, i.e., body part, such as the left shoulder, the goal of body part prediction is to generate a confidence map that indicates the probability of a body part occurring at each location, i.e., pixel. For the i-th ($1 \leq i \leq K$) body part, the corresponding confidence map denotes $C_i$. The corresponding ground truth confidence map $C_i^*$ is generated using all visible i-th body parts from all J people. For the j-th person, $p_{i,j} = (x_{i,j}, y_{i,j})$ denotes the ground truth position of the i-th body part. The ground truth confidence map $C_i^*$ is defined as:

$$C_i^* = \sum_P \max_{0 \leq j \leq J} \left( \exp\left( -\frac{\|p - p_{i,j}\|_2^2}{\sigma^2} \right) \right), \quad (1)$$

where $p=(x,y)$ is the one point in the confidence map and $\sigma$ is the radius of the 2D Gaussian activation. P denotes all the points in the confidence map. For the p point that is affected by multiple people in the same image, the maximum activation from these people is taken as the ground truth.

The Euclidean loss between the predicted confidence map $C_i$ and the ground truth confidence map $C_i^*$ is utilized as a supervision signal, which can be written as:

$$L_C = \sum_{i=1}^{K} \|C_i - C_i^*\|_2^2. \quad (2)$$

When making prediction, i.e., identifying the joints in an image, the image is fed into the convolutional neural network to get all K predicted confidence maps $\{C_i | 1 \leq i \leq K\}$. Non-maximum suppression is then performed on each confidence map to get all K joints. FIG. 2B illustrates an example of an aggregation 221 of all K joint confidence maps generated from the input image 220 of FIG. 2A.

Limb/Skeleton Prediction

Similar to joint prediction that generates confidence maps for joints, the limb, i.e., skeleton, prediction aims to generate a confidence map for all limbs in an image. The confidence map for the limbs shows the probability of limbs occurring at each location in the image. For each target, there are M pre-defined human limbs. According to an embodiment, the M limbs are pre-defined using a target model that indicates target limbs to be identified. The m-th limb ($1 \leq m \leq M$) includes two joints, e.g., $p^{m_1} = (x^{m_1}, y^{m_1})$ and $p^{m_2} = (x^{m_2}, y^{m_2})$, and a rectangular area $P_m$ that covers the limb. The two points $p^{m_1}$ and $p^{m_2}$ define a line segment $l_m$. In the plane, the distance $d_m$ from the point $p=(x,y)$ to the line that pass $l_m$ can be calculated by:

$$d_m = \frac{\left| \begin{array}{c} (y^{m_1} - y^{m_2})x + (x^{m_2} - x^{m_1})y + \\ (y^{m_1}x^{m_1} - y^{m_1}x^{m_2} - y^{m_2}x^{m_1} + y^{m_2}x^{m_2}) \end{array} \right|}{\sqrt{(y^{m_1} - y^{m_2})^2 + (x^{m_2} - x^{m_1})^2}}. \quad (3)$$

For the rectangle area $P_m$ that covers the limb, an embodiment constrains the distance from the point to the line to be smaller than a threshold $\theta$. The threshold $\theta$ can also be viewed as half of the width of the rectangle area. The rectangle area $P_m$ is defined as:

$$P_m = \{p \,|\, d_m < \theta,\, (p - p^{m_1}) \cdot (p^{m_2} - p^{m_1}) \geq 0 \text{ and } (p - p^{m_2}) \cdot (p^{m_1} - p^{m_2}) \geq 0\}. \quad (4)$$

For the j-th person, the corresponding limb area denotes $P_{m,j}$. The ground truth activations of the m-th limbs of all people can be defined as:

$$T_m^* = \sum_P \max_{0 \leq j \leq J} (f(p \,|\, P_{m,j})), \quad (5)$$

where $f(p | P_{m,j})$ is formulated as:

$$f(p \,|\, P_{m,j}) = \begin{cases} 1, & \text{if } p \in P_{m,j} \\ 0, & \text{otherwise} \end{cases}. \quad (6)$$

The confidence map of the ground truth human skeleton $T^*$ consists of all M limbs and can be written as:

$$T^* = \sum_P \max_{1 \leq m \leq M} T_m^*. \quad (7)$$

An embodiment adopts the Euclidean loss to penalize for the difference between the predicted limbs T and the ground truth human skeleton $T^*$:

$$L_T = \|T - T^*\|_2^2. \quad (8)$$

When making a prediction, i.e., identifying limbs, the features extracted from the image are fed into a convolutional neural network to get the limb confidence map T. FIG. 2C illustrates an example of the confidence map 222 for all limbs.

Limb Association

A methodology for associating the identified joints and limbs is described below. To illustrate, consider the image 220 in FIG. 2A which contains two people. FIG. 2B depicts the joints (shown in the confidence map 221 of FIG. 2B) and FIG. 2C depicts the limbs (shown in the confidence map 222 of FIG. 2C) that were identified by feeding the image 220 through a convolutional neural network. Taking the limb that connects the left shoulder and left elbow as an example, there are two left shoulders (left shoulder person 1 (lsp1) and left shoulder person 2 (lsp2)) and two left elbows (left elbow person 1 (lep1) and left elbow person 2 (lep2)) detected in the image. The four parts can generate four limbs that connect left shoulders and left elbows (lsp1 to lep1; lsp1 to lep2; lsp2 to lep1; lsp2 to lep2). Among these four possible limbs, only two of them are correct, lsp1 to lep1 and lsp2 to lep2. Amongst the predicted limbs, the two correct connections have better activations in the limb confidence map than the other two wrong connections. As such, embodiments leverage the limb confidence map to help discriminate the correct connections and wrong connections, i.e., what limbs and joints are associated and what limbs and joints are not associated.

In an embodiment, part association is performed using a greedy bottom-up approach comprising two parts. In such an embodiment, the first part connects all limbs. For the m-th ($1 \leq m \leq M$) limb that connects two body parts $p^{m_1}=(x^{m_1}, y^{m_1})$ and $p^{m_2}=(x^{m_2}, y^{m_2})$, there are two sets of points $P^{m_1}=\{p^{m_1,n_1}|0 \leq n_1 > N_1\}$ and $P^{m_2}=\{p^{m_2,n_n}|0 \leq n_2 \leq N_2\}$, where $N_1$ and $N_2$ are the number of detected body parts from the corresponding predicted confidence maps. The two sets of points define a set of possible connections $D^m=\{(p^{m_1,n_1}, p^{m_2,n_2})|p^{m_1,n_1} \in P^{m_1}, p^{m_2,n_2} \in P^{m_2}\}$. For each connection $(p^{m_1,n_1}, p^{m_2,n_2})$ in $D^m$, a confidence score $s^{m,n_1,n_1}$ from the predicted skeleton is calculated as the probability of a limb occurring:

$$s^{m,n_1,n_2} = \frac{1}{L} \sum_{p \in l_{m,n_1,n_2}} T(p). \qquad (9)$$

where L is the number of pixels in the line segment $l_{m,n_1,n_2}$ between the two points $p^{m_1,n_1}$ and $p^{m_2,n_2}$. In an embodiment, all possible connections are selected by their scores in descent and joints in $P^{m_1}$ and $P^{m_2}$ are removed if one connection is selected. A hard threshold β is also set to filter out connections with low scores. The selection procedure ends when there are no joints left in $P^{m_1}$ and $P^{m_2}$ or $s^{m,n_1,n_2} < \beta$. The second part is to connect limbs into a person. If two limbs share one body part, the two limbs are merged into one person. This merging step is repeated until there are no limbs left.

Network Structure

Figure 4:
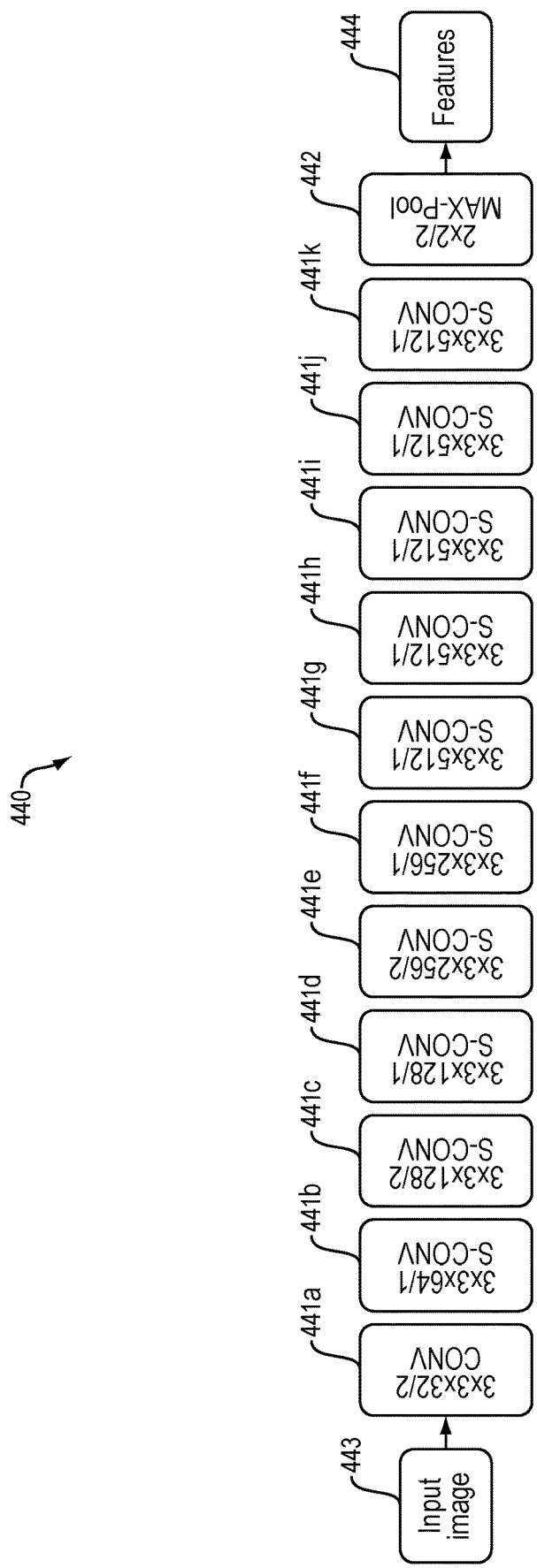
FIG. 4 is a diagram of a module for extracting features from images that is employed in embodiments.

Embodiments leverage convolutional neural networks. Hereinbelow, example convolutional neural network structures that may be employed in embodiments are described. An embodiment adopts the coarse-to-fine multi-stage design from [Wei et al., Convolutional pose machines, *Proceedings of the IEEE Conference on Computer Vision and Pattern Recognition*, pages 4724-4732, 2016; Cao et al., Realtime multi-person 2d pose estimation using part affinity fields, *Proceedings of the IEEE Conference on Computer Vision and Pattern Recognition*, pages 7291-7299, 2017]. To further deploy embodiments in embedded systems, e.g. smart phones, embodiments may leverage depthwise separable convolutions [Howard et al., Mobilenets: Efficient convolutional neural networks for mobile vision applications, arXiv preprint arXiv: 1704.04861, 2017] to build the network to make the model lightweight. FIG. 4 depicts a module 440 including a convolutional neural network structure. The neural network comprises 11 convolution layers 441a-k and a max-pooling layer 442. In an embodiment, the first 11 convolutional layers 441a-k are initialized using the same 11 layers in the MobileNet [Howard et al., Mobilenets: Efficient convolutional neural networks for mobile vision applications, arXiv preprint arXiv:1704.04861, 2017] with a width multiplier value of 0.75. In an embodiment, the module 440 is employed for feature extraction, e.g., in the feature extraction module 332, to extract features 444 from an input image 443.

As noted above, in an embodiment, a framework includes an initialization prediction module and a refinement module which may each be implemented by respective convolutional neural networks.

Figure 5:
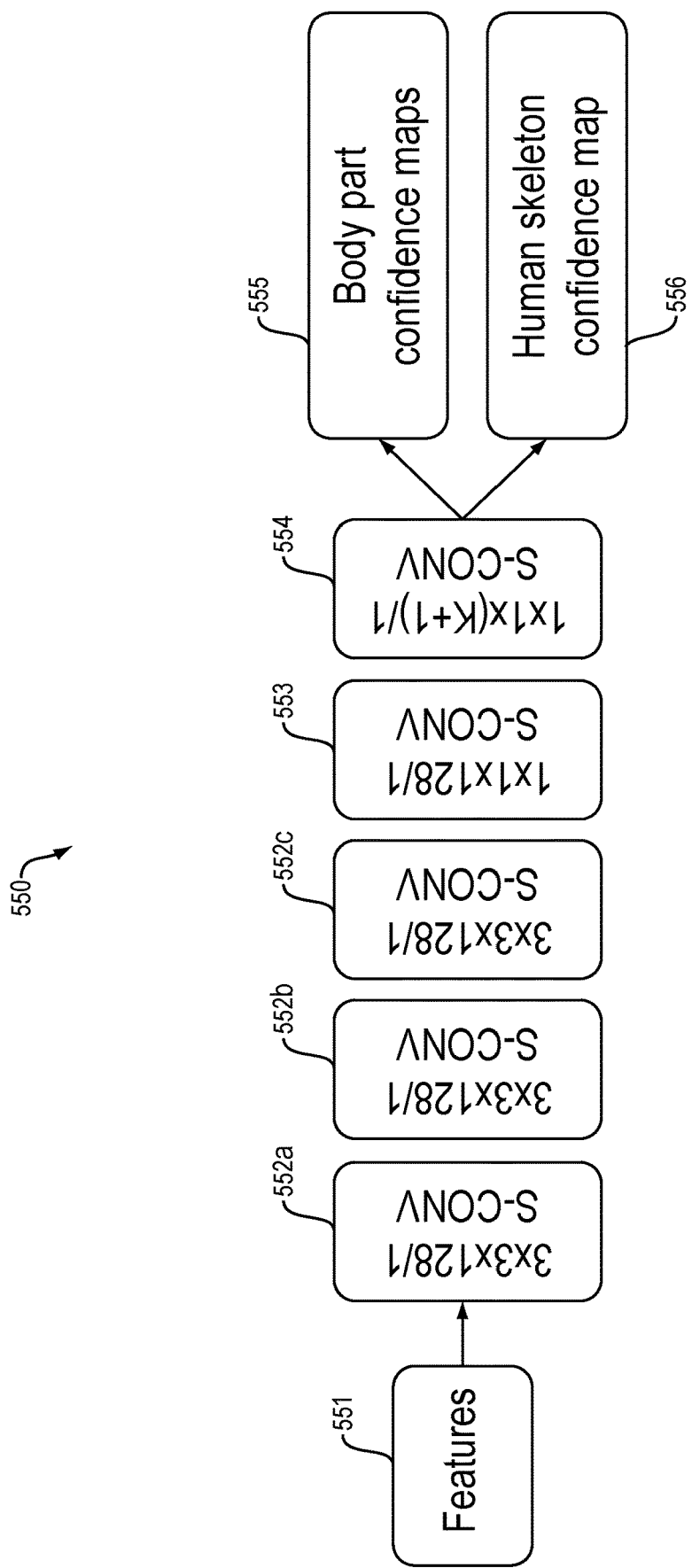
FIG. 5 depicts a module including a convolutional network that may be employed in an embodiment to identify joints and limbs.

FIG. 5 illustrates an initialization module 550 implemented with a convolutional neural network. The initialization module 550 takes extracted features 551 as input. In an embodiment, the extracted features 551 are from a feature extraction network such as the network 440 described hereinabove in relation to FIG. 4. The initialization module 550 is comprised of three 3×3×128 separable convolution layers 552a-c, a 1×1×128 separable convolution layer 553, and a 1×1×(K+1) separable convolution layer 554. The output of the initialization module 550 is body part, e.g., joint, confidence maps 555 and a limb confidence map 556, e.g., a human skeleton confidence map. In an embodiment, the output of the initialization module 550 is K+1 confidence maps, in which K confidence maps are for the K body joints and 1 confidence map is for the limbs.

Figure 6:
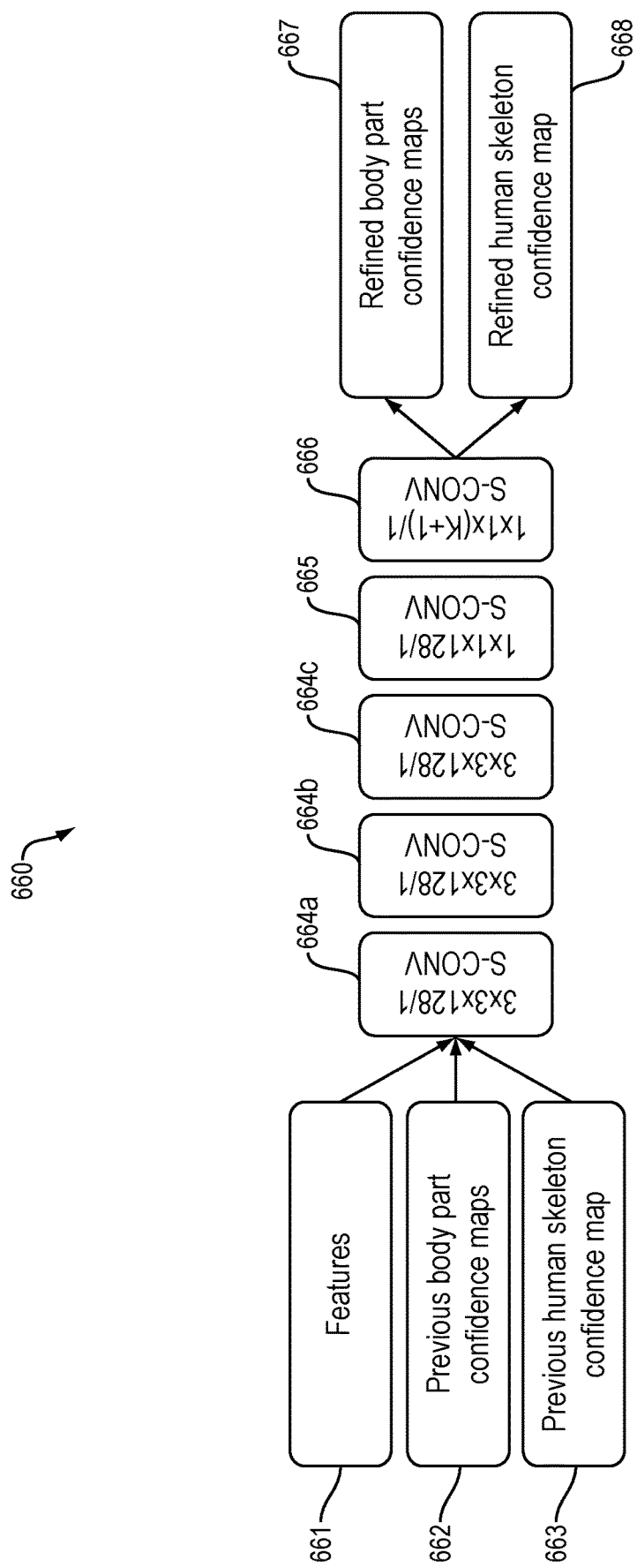
FIG. 6 is a simplified diagram of a module comprising a convolutional network that may be implemented in an embodiment.

FIG. 6 illustrates a refinement module 660 implemented with a convolutional neural network. The input to the refinement module 660 is a concatenate of extracted features 661, joint confidence maps 662, and a limb confidence map 663. According to an embodiment, the extracted features are the output 444 of the module 440 and the confidence map inputs 662 and 663 are the outputs 555 and 556 from the module 550. The refinement module 660 is comprised of five stages. The five layers are three 3×3×128 separable convolution layers 664a-c, a 1×1×128 separable convolution layer 665, and a 1×1×(K+1) separable convolution layer 666. The output of the module 660 is the refined joint confidence maps 667 and the refined limb confidence map 668. The total number of outputted refined confidence maps is K+1, where K confidence maps are for the K joints and 1 confidence map is for the limbs. In an embodiment, the loss term from Equation (2) and (8) is applied to every intermediate output from each stage, which helps to solve the vanished gradients problem [Szegedy et al., Going deeper with convolutions, "*Proceedings of the IEEE Conference on Computer Vision and Pattern Recognition*", 2015; Cao et al., Realtime multi-person 2d pose estimation using part affinity fields, *Proceedings of the IEEE Conference on Computer Vision and Pattern Recognition*, pages 7291-7299, 2017].

Existing methods utilize neural networks but do not utilize the same convolution neural network structures as embodiments and do not provide the same functionality as embodiments. For instance, CPM [Wei et al., Convolutional pose machines, *Proceedings of the IEEE Conference on Computer Vision and Pattern Recognition*, pages 4724-4732, 2016] and PAF [Cao et al., Realtime multi-person 2d pose estimation using part affinity fields, *Proceedings of the IEEE Conference on Computer Vision and Pattern Recognition, pages 7291-7299, 2017], also utilize multi-stage design. However, in CPM [Wei et al., Convolutional pose machines, *Proceedings of the IEEE Conference on Computer Vision and Pattern Recognition*, pages 4724-4732, 2016], the first stage has different convolution structures compared with other stages. Further, CPM [Wei et al., Convolutional pose machines, *Proceedings of the IEEE Conference on Computer Vision and Pattern Recognition*, pages 4724-4732, 2016] cannot predict limbs as well as the confidence maps for joints. In PAF [Cao et al., Realtime multi-person 2d pose estimation using part affinity fields, *Proceedings of the IEEE Conference on Computer Vision and Pattern Recognition*, pages 7291-7299, 2017], two different branches, i.e., two different convolutional neural networks are used to identify joints and part affinity fields, i.e., limbs, separately. In contrast, embodiments use a single network, e.g., the network 550, to identify joints and limbs in an image.

Separable Convolution

Separable convolution [Howard et al., Mobilenets: Efficient convolutional neural networks for mobile vision applications, arXiv preprint arXiv:1704.04861, 2017] is used in embodiments. For instance, separable convolution elements are used to implement the networks used for feature extraction (described hereinabove in relation to FIG. 4), initialization (described hereinabove in relation to FIG. 5) and refinement (described hereinabove in relation to FIG. 6). Different convolution modules are further discussed below.

Figure 7:
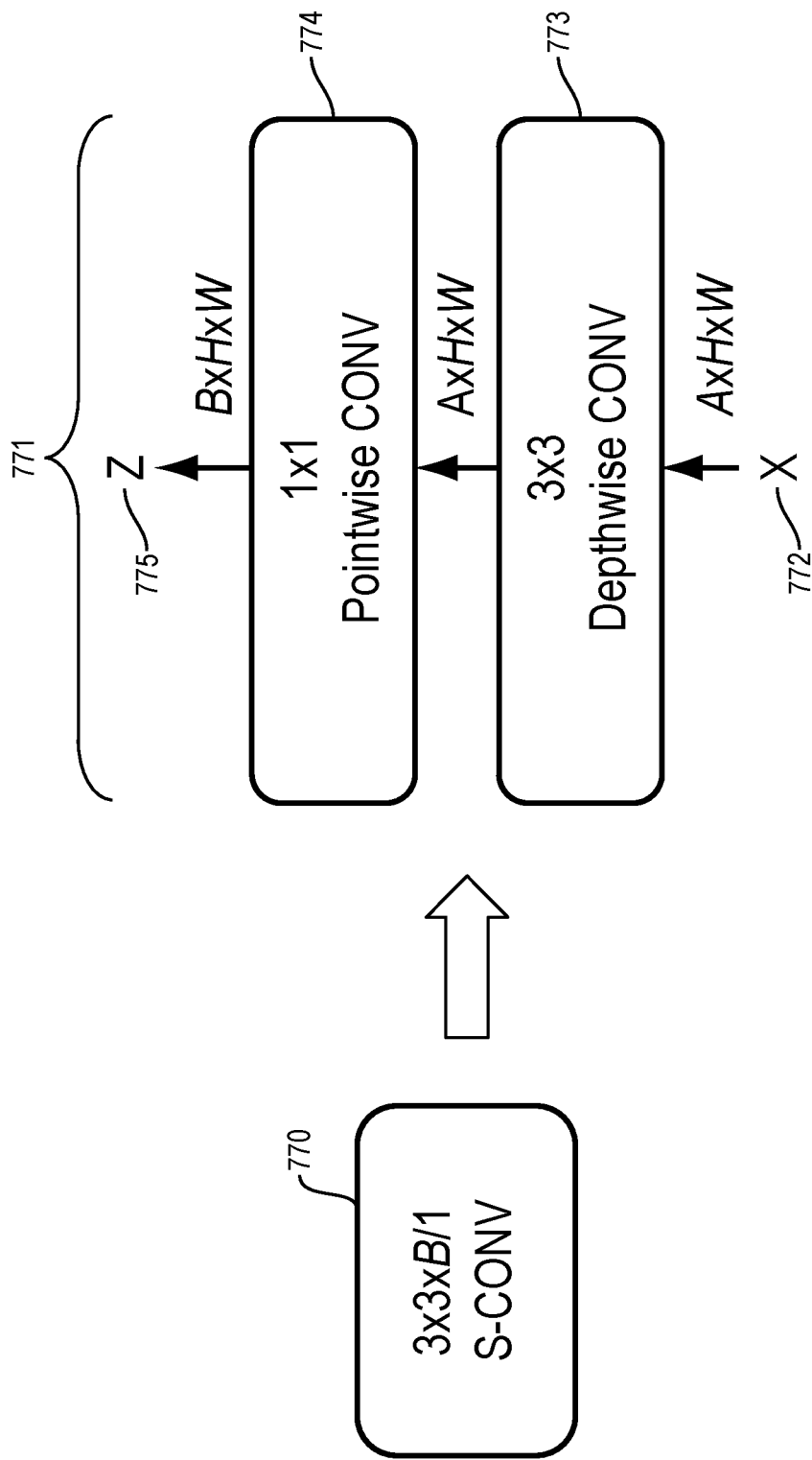
FIG. 7 is a block diagram of a separable convolutional module and functionality thereof that may be employed in a convolutional neural network implementing embodiments.

FIG. 7 depicts a separable convolution module 770 with kernel size 3×3, stride 1 and output channel B and the functionality 771 implemented by the module 770. The input 772 to the module 770 has the size A×H×W. Depthwise convolution 773 is performed on the input 772 and after the depthwise convolution 773 [Howard et al., Mobilenets: Efficient convolutional neural networks for mobile vision applications, arXiv preprint arXiv:1704.04861, 2017], the intermediate result has the same size A×H×W because the stride is 1. Pointwise convolution 774 is performed on the intermediate result of the depthwise convolution 774. The pointwise convolution 774 [Howard et al., Mobilenets: Efficient convolutional neural networks for mobile vision applications, arXiv preprint arXiv: 1704.04861, 2017] changes the number of channels. After the pointwise convolution 774, the output 775 size is B×H×W. Embodiments may use the module 770 to implement convolutional neural networks for feature extraction, initialization, and/or refinement.

Figure 8:
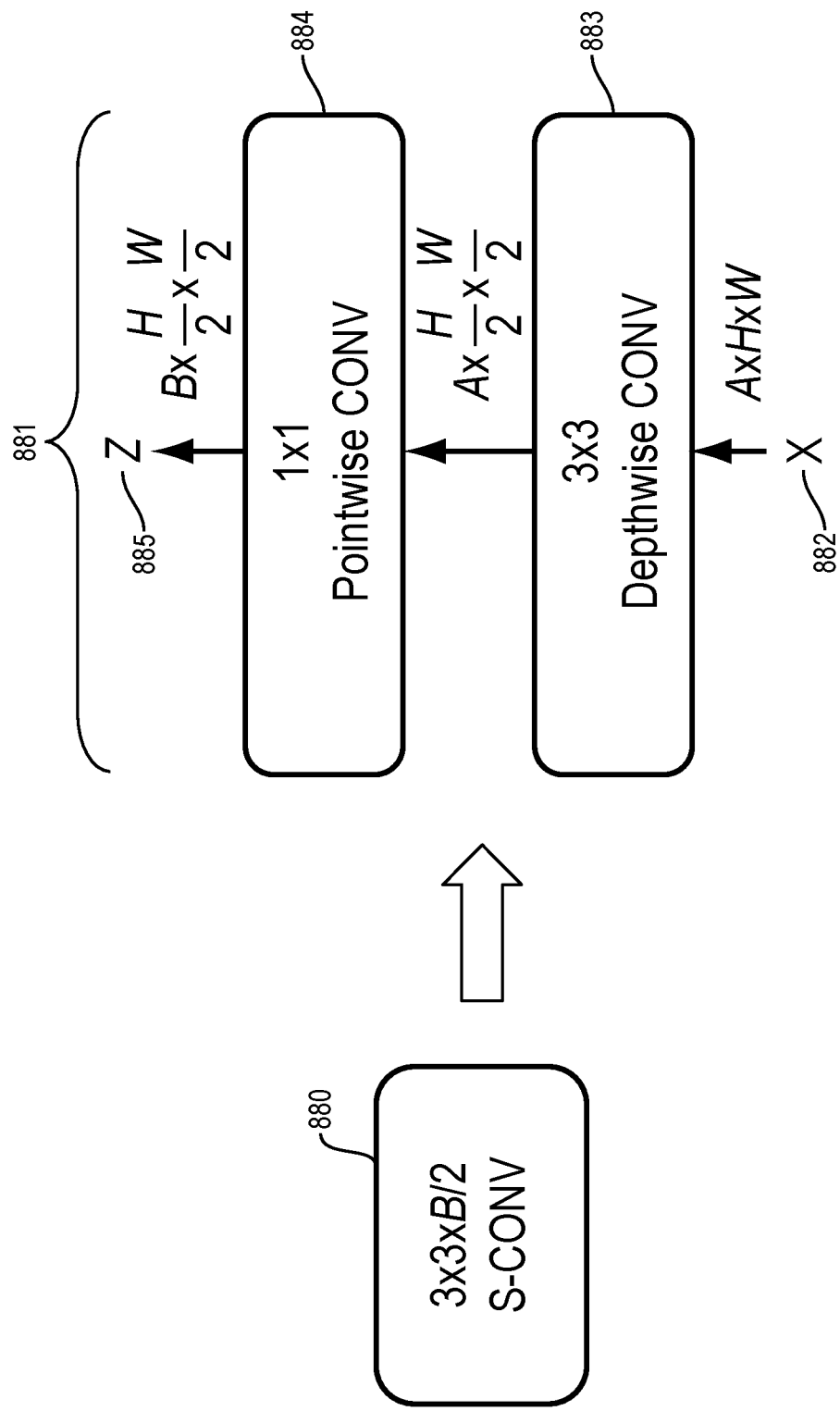
FIG. 8 depicts a separable convolutional module and functionality thereof that may be implemented in embodiments.

FIG. 8 illustrates a separable convolution module with kernel size 3×3, stride 2 and output channel B. FIG. 8 also depicts the functionality 881 that may be implemented by the module 880. The input 882 has the size A×H×W. Depthwise convolution 883 is performed on the input 882 and after the depthwise convolution [Howard et al., Mobilenets: Efficient convolutional neural networks for mobile vision applications, arXiv preprint arXiv:1704.04861, 2017], the intermediate result has a reduced height and width with the size $$A \times \frac{H}{2} \times \frac{W}{2}$$

because the stride is 2. The pointwise convolution 884 [Howard et al., Mobilenets: Efficient convolutional neural networks for mobile vision applications, arXiv preprint arXiv:1704.04861, 2017] is applied thereafter to change the number of channels. After the pointwise convolution 884, the output 885 size is $$B \times \frac{H}{2} \times \frac{W}{2}.$$

According to an embodiment, the module 880 used in feature extraction.

Figure 9:
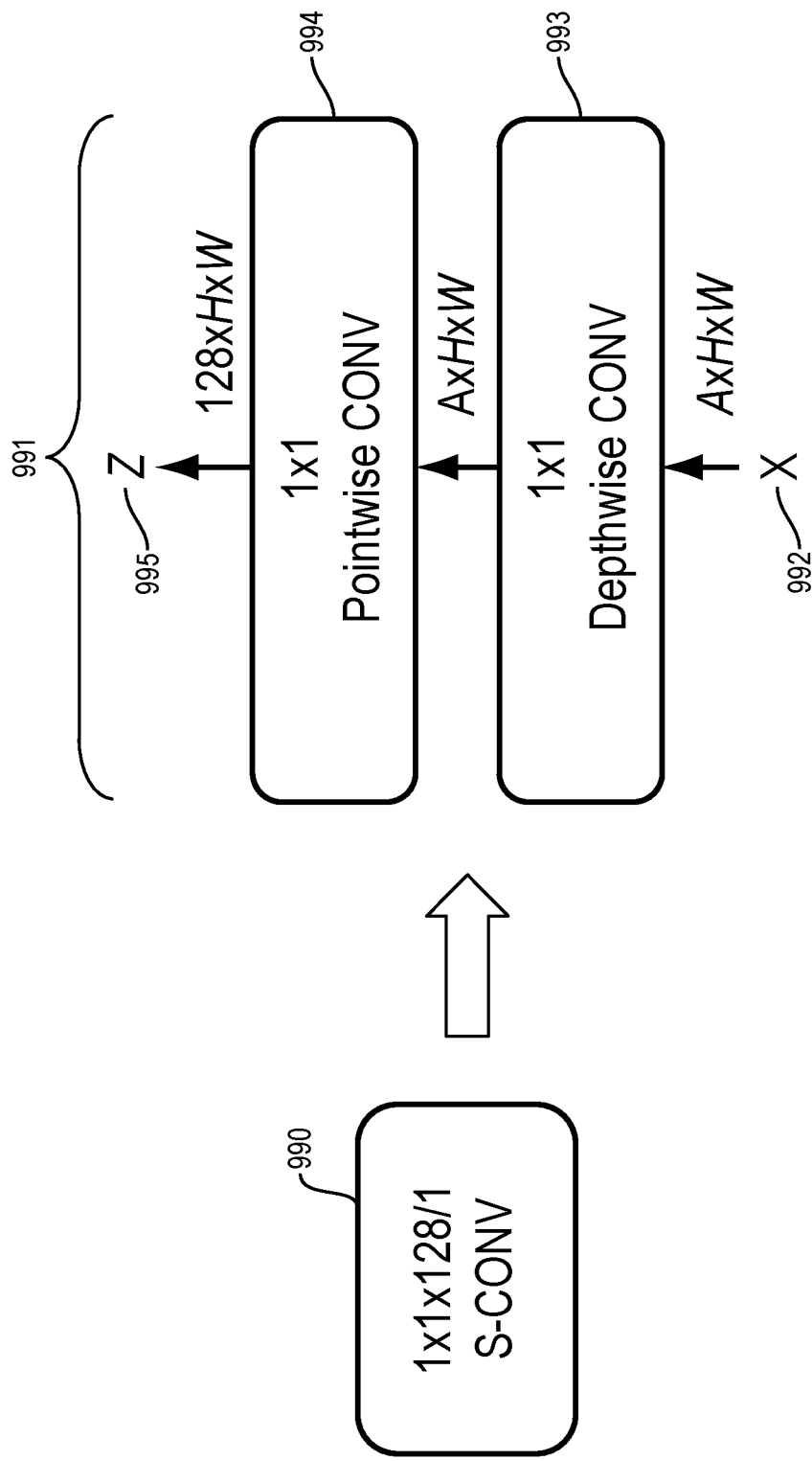
FIG. 9 illustrates a convolutional module and the module's functionality that may be utilized in embodiments.

FIG. 9 depicts the separable convolution module 990 with kernel size 1×1, stride 1 and output channel 128. FIG. 9 also depicts the functionality 991 that may be implemented by the module 990. The input 992 has the size A×H×W. Depthwise convolution 993 is performed on the input 992 and after the depthwise convolution [Howard et al., Mobilenets: Efficient convolutional neural networks for mobile vision applications, arXiv preprint arXiv:1704.04861, 2017], the intermediate result has the same size A×H×W because the stride is 1. The pointwise convolution 994 [Howard et al., Mobilenets: Efficient convolutional neural networks for mobile vision applications, arXiv preprint arXiv:1704.04861, 2017] is applied thereafter to change the number of channels. After the pointwise convolution 994, the output 995 size is 128×H×W. In an embodiment, the module 990 is used in initialization and refinement.

Figure 10:
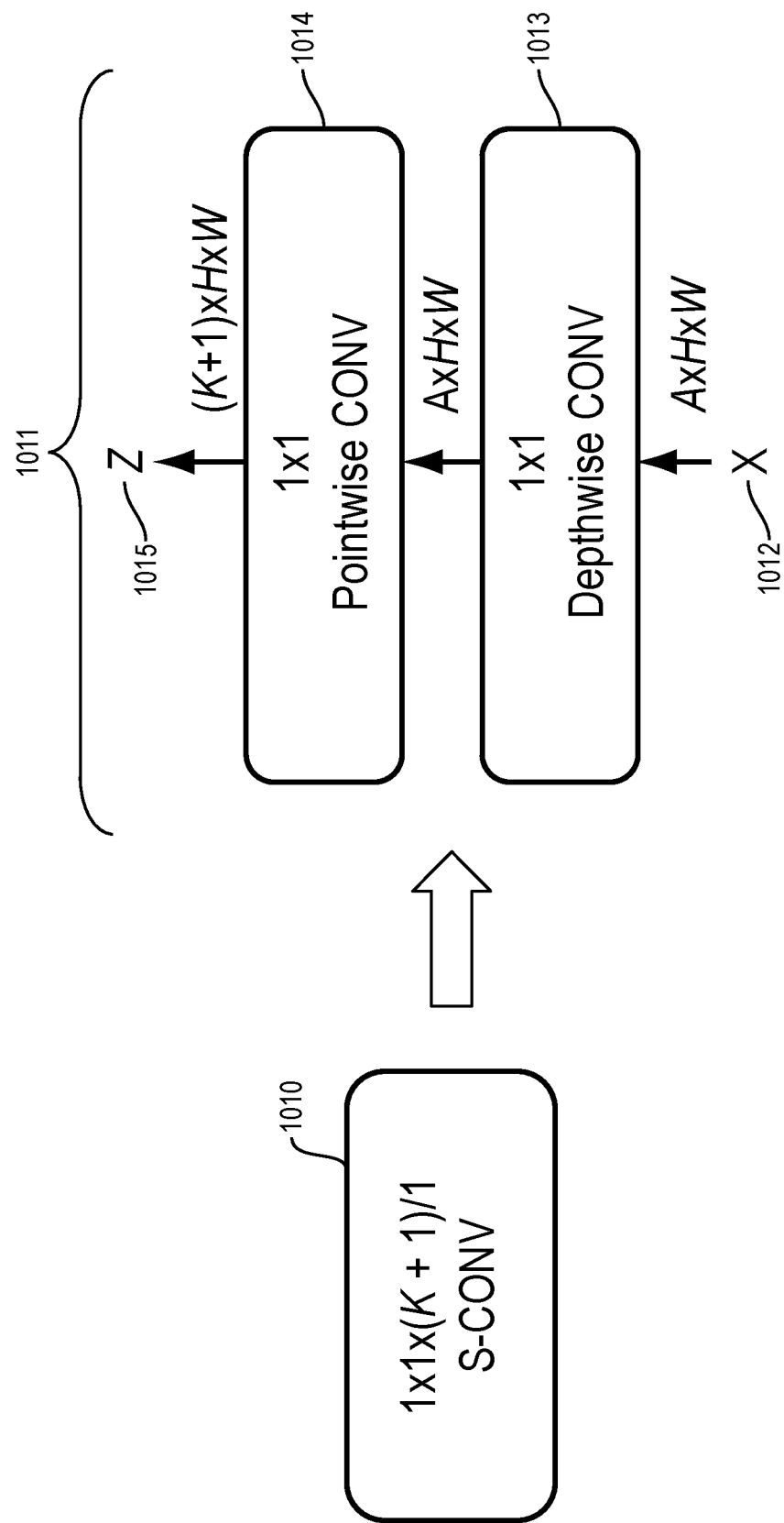
FIG. 10 is a simplified diagram of a convolutional module and the module's functionality that may be employed in embodiments.

FIG. 10 illustrates a separable convolution module 1010 with kernel size 1×1, stride 1 and output channel K+1. FIG. 10 also depicts the functionality 1011 that may be implemented by the module 1010. The input 1012 has the size A×H×W. Depthwise convolution 1013 is performed on the input 1012 and after the depthwise convolution 1013 [Howard et al., Mobilenets: Efficient convolutional neural networks for mobile vision applications, arXiv preprint arXiv: 1704.04861, 2017], the intermediate result has the same size A×H×W because the stride is 1. Pointwise convolution 1014 [Howard et al., Mobilenets: Efficient convolutional neural networks for mobile vision applications, arXiv preprint arXiv:1704.04861, 2017] is applied thereafter to change the number of channels. After the pointwise convolution 1014, the output 1015 size is (K+1)×H×W. Embodiments may use the module 1010 in initialization and refinement.

An example embodiment of the invention may be applied to a multi-person pose estimation task using a novel deep convolutional neural network. In particular, the embodiment may be used to estimate multiple person poses in one image, which is to locate body parts/joints (e.g., head, shoulder, elbow and wrist) for all people. Embodiments can estimate human poses accurately and are fast in inference.

An embodiment predicts a human skeleton directly, i.e., predicts all limbs at once rather than predicting each limb one at a time. Advantageously, embodiments can detect body parts and limbs simultaneously. An embodiment utilizes a predicted human skeleton to associate multiple detected body parts with respective persons. In other words, an embodiment utilizes the data on predicted limbs to associate multiple detected joints with respective targets. An embodiment uses a light weight convolutional neural network structure. Embodiments also operate quickly and can reach 100 fps on a workstation using one GPU.

An embodiment introduces a human skeleton/limb prediction to detect all limbs using one single output confidence map, which is not known to be explored by other methods. In an embodiment, the detected body parts are associated with the help of the predicted human skeleton in one image while no known existing method associates body parts in this way. The example approach utilizes a light weight convolutional neural network structure that is designed to predict body parts and human skeletons simultaneously. Embodiments of this invention can be applied for motion analysis, sport analysis, tracking, and human action recognition, among others, which can be employed in a wide variety of applications in sports and surveillance areas.

An example embodiment of the invention presents a light weight framework that directly predicts body parts as well as human skeletons and employs a separable convolution in designing a network structure. A deep convolutional neural network may be used to directly generate confidence maps for body parts. The confidence maps show the probability of each body part occurring at each location. In addition to the confidence maps for body parts, an additional confidence map is generated at the same time to predict all human skeletons, i.e., limbs, in an image. The confidence map for the skeleton shows the probability of the limbs occurring at each location. In one embodiment, one limb is defined as a rectangular area that is between two associated body parts, i.e., joints. For an ideal case, in an example embodiment, responses on a limb area are 1 while another area has 0 response. In an example embodiment, the human skeleton includes all limbs in the image of multiple people. According to an embodiment, a Euclidean loss is applied to regress the confidence map of the human skeleton. In embodiments, the cost of increasing one confidence map is small, but it helps to solve the body part association problem. In an embodiment, when making an inference to associate two body parts, the limb that passes two correct body parts has a high response in the human skeleton confidence map; otherwise, the two body parts should not be associated together.

Figure 11:
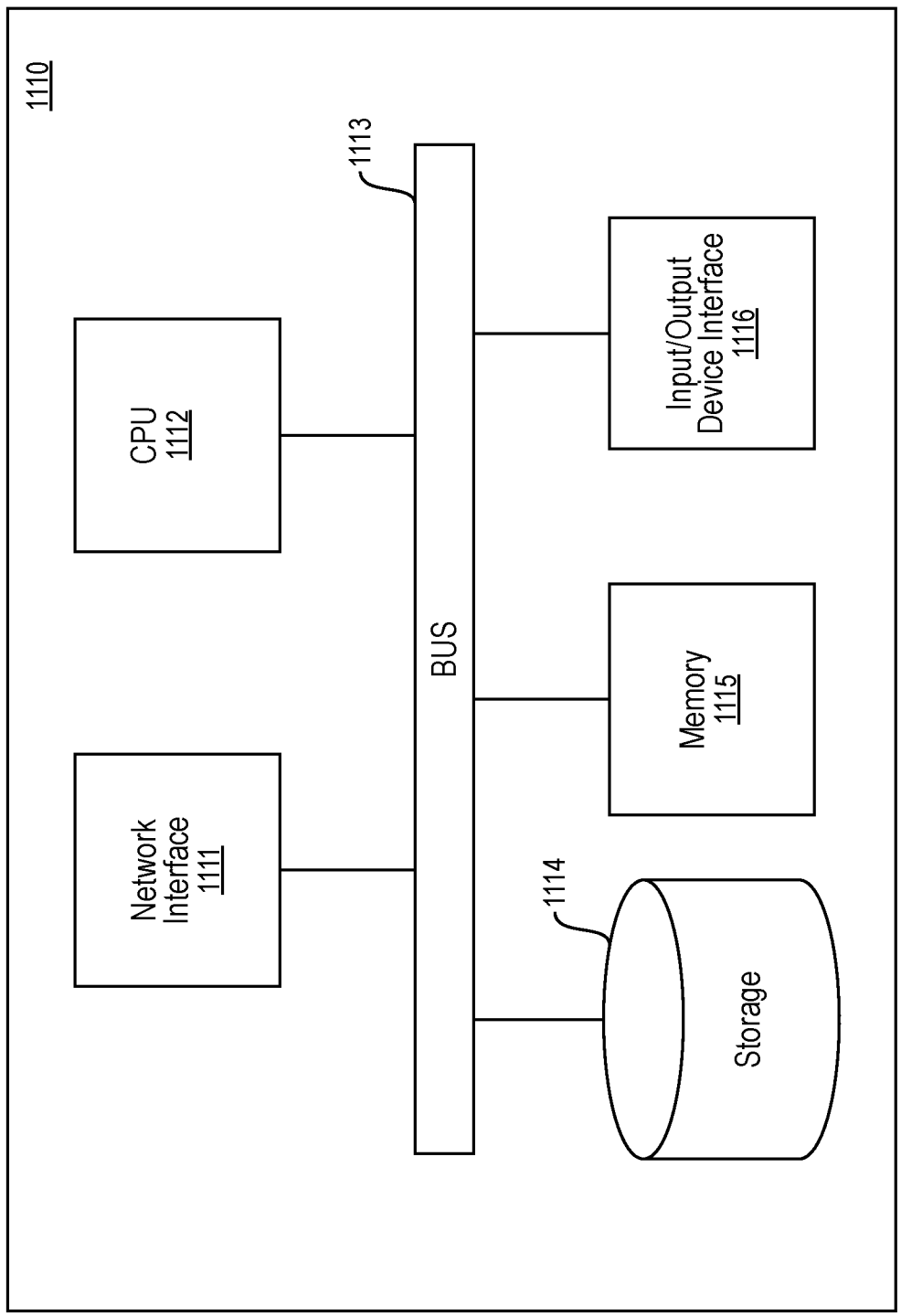
FIG. 11 is a simplified block diagram of a computer system for identifying joints and limbs in an image according to an embodiment.

FIG. 11 is a simplified block diagram of a computer-based system 1110 that may be used to implement any variety of the embodiments of the present invention described herein. The system 1110 comprises a bus 1113. The bus 1113 serves as an interconnect between the various components of the system 1110. Connected to the bus 1113 is an input/output device interface 1116 for connecting various input and output devices such as a keyboard, mouse, display, speakers, etc. to the system 1110. A central processing unit (CPU) 1112 is connected to the bus 1113 and provides for the execution of computer instructions implementing embodiments. Memory 1115 provides volatile storage for data used for carrying out computer instructions implementing embodiments described herein, such as those embodiments previously described hereinabove. Storage 1114 provides non-volatile storage for software instructions, such as an operating system (not shown) and embodiment configurations, etc. The system 1110 also comprises a network interface 1111 for connecting to any variety of networks known in the art, including wide area networks (WANs) and local area networks (LANs).

It should be understood that the example embodiments described herein may be implemented in many different ways. In some instances, the various methods and systems described herein may each be implemented by a physical, virtual, or hybrid general purpose computer, such as the computer system 1110, or a computer network environment such as the computer environment 1220, described herein below in relation to FIG. 12. The computer system 1110 may be transformed into the systems that execute the methods described herein, for example, by loading software instructions into either memory 1115 or non-volatile storage 1114 for execution by the CPU 1112. One of ordinary skill in the art should further understand that the system 1110 and its various components may be configured to carry out any embodiments or combination of embodiments of the present invention described herein. Further, the system 1110 may implement the various embodiments described herein utilizing any combination of hardware, software, and firmware modules operatively coupled, internally or externally, to the system 1110.

Figure 12:
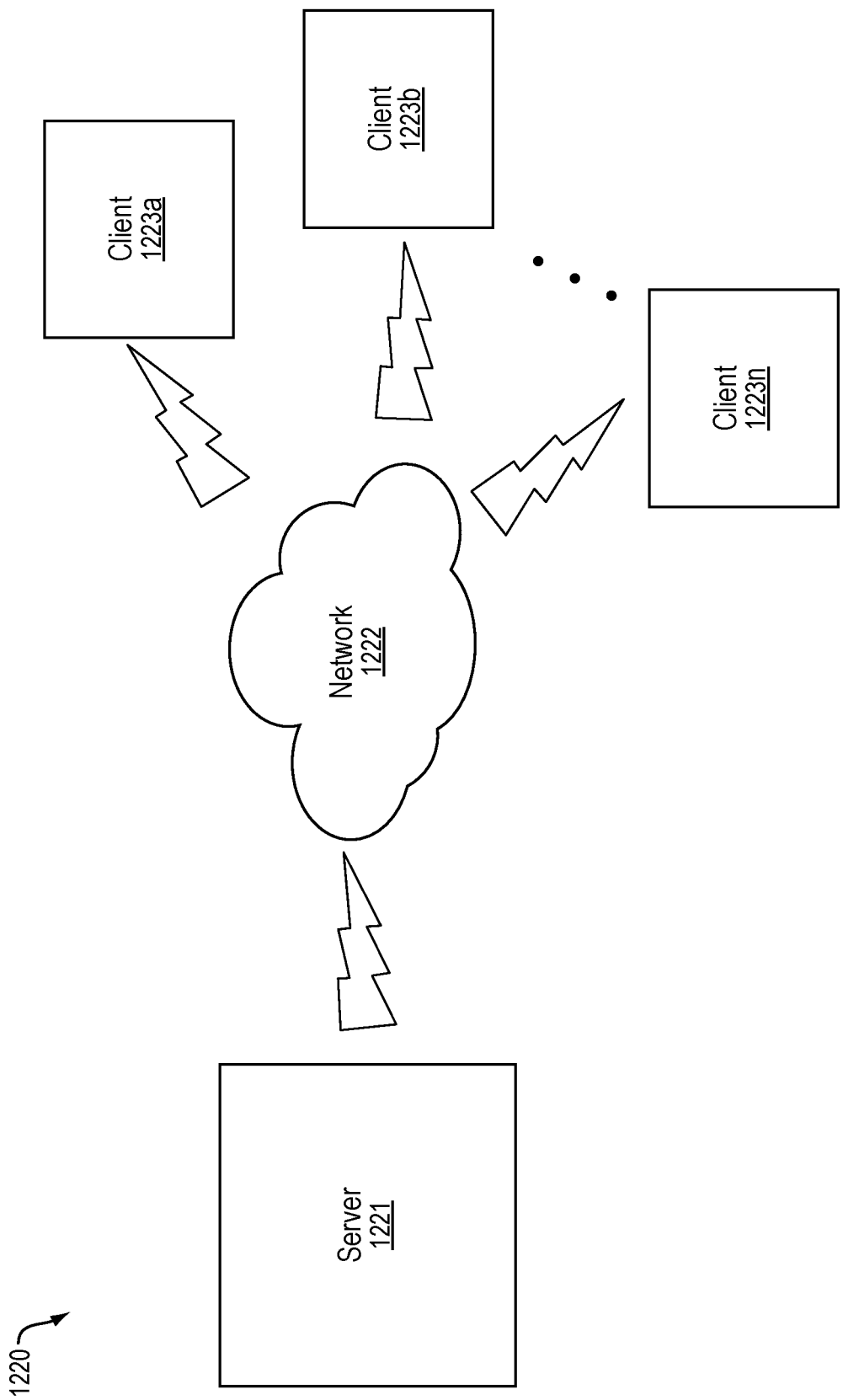
FIG. 12 is a simplified diagram of a computer network environment in which an embodiment of the present invention may be implemented.

FIG. 12 illustrates a computer network environment 1220 in which an embodiment of the present invention may be implemented. In the computer network environment 1220, the server 1221 is linked through the communications network 1222 to the clients 1223a-n. The environment 1220 may be used to allow the clients 1223a-n, alone or in combination with the server 1221, to execute any of the embodiments described herein. For non-limiting example, computer network environment 1220 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method of identifying joints and limbs in an image, the method comprising:
   extracting features from an image to generate feature maps;
   processing the feature maps using a single convolutional neural network formed of separable convolutional network elements and trained based on a target model that includes joints and a plurality of target limbs, the processing directly generating both a directionless joint confidence map indicating confidence with which pixels in the image depict one or more joints and a single directionless limb confidence map indicating confidence with which the pixels in the image depict one or more limbs, of the plurality of target limbs, between adjacent joints of the one or more joints, adjacency of joints being provided by the target model; and generating indications of the one or more joints and the one or more limbs in the image using the directionless joint confidence map, the directionless limb confidence map, and the target model.

2. The computer-implemented method of claim 1 wherein the convolutional neural network is a first convolutional neural network and wherein the method further comprises:

concatenating the feature maps, the directionless joint confidence map, and the directionless limb confidence map;

processing the concatenated feature maps, directionless joint confidence map, and directionless limb confidence map using a second convolutional neural network trained based on the target model, the processing using the second convolutional neural network to generate both a refined directionless joint confidence map indicating confidence with which pixels in the image depict the one or more joints and a refined directionless limb confidence map indicating confidence with which the pixels in the image depict the one or more limbs; and generating the indications of the one or more joints and the one or more limbs in the image using the refined directionless joint confidence map, the refined directionless limb confidence map, and the target model.

3. The computer-implemented method of claim 1 wherein the convolutional neural network has a single set of weights and the method further comprises:

training the convolutional neural network, based on the target model, by adjusting the single set of weights.

4. The computer-implemented method of claim 1 wherein the target model represents at least one of: a human, animal, machine, and robot.

5. The computer-implemented method of claim 1 wherein the target model indicates joints and limbs of a target object.

6. The computer-implemented method of claim 1 wherein the image contains multiple target objects, and further comprising:

generating indications of limbs and joints in the image for each of the multiple target objects.

7. The computer-implemented method of claim 6 further comprising:

generating respective indications of a pose of each of the multiple target objects.

8. The computer-implemented method of claim 1 wherein processing the feature maps using a single convolutional neural network further comprises:

generating a respective joint confidence map for each joint type in the image, each respective joint confidence map indicating confidence with which pixels in the image depict a respective joint type.

9. A computer system for identifying joints and limbs in an image, the computer system comprising:

a processor; and a memory with computer code instructions stored thereon, the processor and the memory, with the computer code instructions, being configured to cause the system to:

extract features from an image to generate feature maps;

process the feature maps using a single convolutional neural network formed of separable convolutional network elements and trained based on a target model that includes joints and a plurality of target limbs, the processing directly generating both a directionless joint confidence map indicating confidence with which pixels in the image depict one or more joints and a single directionless limb confidence map indicating confidence with which the pixels in the image depict one or more limbs, of the plurality of target limbs, between adjacent joints of the one or more joints, adjacency of joints being provided by the target model; and generate indications of the one or more joints and the one or more limbs in the image using the directionless joint confidence map, the directionless limb confidence map, and the target model.

10. The system of claim 9 wherein the convolutional neural network is a first convolutional neural network and wherein the processor and the memory, with the computer code instructions, are further configured to cause the system to:

concatenate the feature maps, the directionless joint confidence map, and the directionless limb confidence map;

process the concatenated feature maps, directionless joint confidence map, and directionless limb confidence map using a second convolutional neural network trained based on the target model, the processing using the second convolutional neural network to generate both a refined directionless joint confidence map indicating confidence with which pixels in the image depict the one or more joints and a refined directionless limb confidence map indicating confidence with which the pixels in the image depict the one or more limbs; and generate the indications of the one or more joints and the one or more limbs in the image using the refined directionless joint confidence map, the refined directionless limb confidence map, and the target model.

11. The system of claim 9 wherein the convolutional neural network has a single set of weights and the processor and the memory, with the computer code instructions, are further configured to cause the system to:

train the convolutional neural network, based on the target model, by adjusting the single set of weights.

12. The system of claim 9 wherein the target model represents at least one of: a human, animal, machine, and robot.

13. The system of claim 9 wherein the target model indicates joints and limbs of a target object.

14. The system of claim 9 wherein the image contains multiple target objects and wherein the processor and the memory, with the computer code instructions, are further configured to cause the system to:

generate indications of limbs and joints in the image for each of the multiple target objects.

15. The system of claim 14 wherein the processor and the memory, with the computer code instructions, are further configured to cause the system to:

generate respective indications of a pose of each of the multiple target objects.

16. The system of claim 9 wherein, in processing the feature maps using a single convolutional neural network, the processor and the memory, with the computer code instructions, are further configured to cause the system to:

generate a respective joint confidence map for each joint type in the image, each respective joint confidence map indicating confidence with which pixels in the image depict a respective joint type.

17. A computer program product for identifying joints and limbs in an image, the computer program product comprising: one or more non-transitory computer-readable storage devices and program instructions stored on at least one of the one or more storage devices, the program instructions, when loaded and executed by a processor, cause an apparatus associated with the processor to: extract features from an image to generate feature maps; process the feature maps using a single convolutional neural network formed of separable convolutional network elements and trained based on a target model that includes joints and a plurality of target limbs, the processing directly generating both a directionless joint confidence map indicating confidence with which pixels in the image depict one or more joints and a single directionless limb confidence map indicating confidence with which the pixels in the image depict one or more limbs, of the plurality of target limbs, between adjacent joints of the one or more joints, adjacency of joints being provided by the target model; and generate indications of the one or more joints and the one or more limbs in the image using the directionless joint confidence map, the directionless limb confidence map, and the target model.

18. The computer program product of claim 17 where the program instructions, when loaded and executed by the processor, further cause the apparatus associated with the processor to:
concatenate the feature maps, the directionless joint confidence map, and the directionless limb confidence map;
process the concatenated feature maps, directionless joint confidence map, and directionless limb confidence map using a second convolutional neural network trained based on the target model, the processing using the second convolutional neural network to generate both a refined directionless joint confidence map indicating confidence with which pixels in the image depict the one or more joints and a refined directionless limb confidence map indicating confidence with which the pixels in the image depict the one or more limbs; and
generate the indications of the one or more joints and the one or more limbs in the image using the refined directionless joint confidence map, the refined directionless limb confidence map, and the target model.

* * * * *